(12) United States Patent
Dragoset Jr.

(10) Patent No.: US 6,169,959 B1
(45) Date of Patent: Jan. 2, 2001

(54) METHOD OF PREDICTING KINEMATICS FOR SURFACE MULTIPLES

(75) Inventor: William Henry Dragoset Jr., Houston, TX (US)

(73) Assignee: Baker Hughes Incorporated, Houston, TX (US)

(*) Notice: Under 35 U.S.C. 154(b), the term of this patent shall be extended for 0 days.

(21) Appl. No.: 09/320,954

(22) Filed: May 27, 1999

(51) Int. Cl.[7] ................................................... G01V 1/28
(52) U.S. Cl. .............................. 702/17; 367/24; 367/73
(58) Field of Search ......................... 702/17, 18; 367/21, 367/24, 73, 52, 50, 51

(56) References Cited

U.S. PATENT DOCUMENTS

| | | | |
|---|---|---|---|
| 4,363,113 | * 12/1982 | Taner et al. | 367/21 |
| 4,415,999 | * 11/1983 | Moeckel et al. | 367/73 |
| 5,062,086 | * 10/1991 | Harlan et al. | 367/73 |
| 5,978,314 | * 12/1982 | Pham | 367/52 |

* cited by examiner

*Primary Examiner*—Donald E. McElheny Jr.
(74) *Attorney, Agent, or Firm*—Madan, Mossman & Sriram, P.C.

(57) ABSTRACT

Traveltimes of multiply reflected seismic events in a seismic profile or a model are determined from traveltimes for primary events. The traveltimes for the primary events may be obtained by ray tracing through a velocity model of the subsurface of by picking traveltimes from primary reflection horizons present in an actual seismic data set. The traveltimes for the primary events define a traveltime table for various combinations of source and receiver locations. The traveltime for a multiple corresponding to specified source and receiver positions is then determined by summing the traveltimes for primary events from the source to an interim point and from the interim point to the receiver: the correct location of the interim point corresponding to an actual multiple reflection raypath from the source to the receiver is the one that, according to Fermat's principle, has the minimum value for the sum. This method is applicable to all primary events, so that subsurface multiples as well as water bottom multiples can be determined. The method may also be used for determining traveltimes for higher order multiples.

12 Claims, 5 Drawing Sheets

METHOD OF PREDICTING KINEMATICS FOR SURFACE MULTIPLES

BACKGROUND OF THE INVENTION

1. Field of the Invention

This invention relates to the field of seismic data processing. More particularly, this invention relates to a method of predicting the arrival times of multiple reflection events that obscure true seismic events in seismic exploration records from measurements of travel times of primary reflection events.

2. Background of the Art

In reflection seismology, acoustic waves are imparted into the earth, generally by activation of a seismic source. Acoustic receivers detect the acoustic waves after their reflection from sub-surface strata and interfaces. Analysis of the acoustic waves, together with the known position of the source and receiver is used to provide an image of the subsurface.

Surface multiple reflections occur in seismic data when acoustic waves traveling from a seismic source to a seismic receiver reflect upwards from subsurface changes in acoustic impedance at least twice and downwards from the surface at least once. Primary reflections, on the other hand, refer to seismic events that experience only a single reflection from a change in acoustic impedance. Generally, surface multiple reflections in a seismic data set are considered undesirable noises that interfere with and complicate the desired signal. Considerable effort is expended in the design of seismic data acquisition and the processing of seismic data to limit the impact of multiple reflections on the final processed seismic profiles. Even so, in many areas, the quality of seismic data is lowered, sometimes substantially, by the presence of multiple reflections.

Various prior art methods have been tried for removal of surface multiples from recorded traces. For simple geometric situations, the arrival times of surface multiple reflections can be calculated analytically. For example, when the water bottom and the reflecting horizons are flat, the arrival time for a primary reflection is given by the well-known relation $$t^2 = t_0^2 + \frac{x^2}{V_e^2} \tag{1}$$

where t is the arrival time at a source-receiver offset of x, $t_0$ is the arrival time for a zero source-receiver offset, and $V_e$ is an effective velocity. Equation (1) is valid for values of the source-receiver offset that are commonly used in seismic data acquisition. The multiple reflection from the same reflecting horizon has a zero-offset travel time that is twice that of the primary reflection, and the arrival time of the multiple is given by $$t^2 = 4t_0^2 + \frac{x^2}{V_e^2} \tag{2}$$

When the subsurface reflectors are not uniformly flat, and in more complex geology, complex ray tracing schemes that generate synthetic multiples and subtract them from the actual seismic record to obtain a supposedly multiple-free record are used. However, these methods are very awkward in that they require significant knowledge of the subsea structure as well as the ocean bottom configuration before the synthetics can be generated. Similar synthetic multiples can be generated using more accurate methods not directly involving ray tracing, e.g., wavefield propagation techniques, but again these require detailed knowledge of at least the ocean bottom, as well as the shape of the subsea interfaces, and so are not as practical as would be desired.

Patent Publication WO 97/1130 discloses a method for attenuating water-related multiples in seismic data. The method relies on an efficient ray-tracing procedure to determine traveltimes for each multiple. The characteristics of the seismic data are used to estimate the waveform of the multiple to be attenuated. The traveltime and the estimated waveform are then used to attenuate the multiple from the original data. The method is implemented in a system of nonlinear equations that are solved using well-known techniques and an assumed or measured function characterizing the sea-bottom. In a preferred embodiment, lower order multiples, after having been estimated, are used to estimate the higher order multiples, thus reducing computation time.

U.S. Pat. No. 5,587,965 issued to Dragoset & Jericevic discloses a method based on the acoustic wave equation and extrapolation of the seismic wavefield from recorded observations. The method disclosed therein can be computationally time-consuming for large seismic surveys.

U.S. Pat. No. 4,887,243 issued to Pann discloses a method of generating the multiples in a trace by combining pairs of real traces, which pairs have one end point in common and their other ends identical to the source and receiver locations of the trace of interest. The combination step is performed by convolution of the paired traces, as well understood in the art. All possible pairs of multiples which thus "add up" to the trace of interest are examined according to Huygens' Principle, stating that the one of a plurality of possible waves which takes the shortest travel time in any real system is that which actually occurs. Accordingly, the combined pair of real traces with the wave which has the shortest total travel time is equivalent to the wave path actually taken by the multiple. In a preferred embodiment, the synthetic traces are "stacked" to generate a minimum travel time synthetic trace. The convolved traces that are close to the true reflection point add coherently while those further away stack incoherently, giving an approximate realization of a multiple trace. The synthetic multiple trace thus generated can be subtracted from the trace under analysis to yield a multiple-free trace. Generation of a single trace having multiples thus requires the convolution of a large number of separate traces and then summing their respective output. The reason why a large number of separate traces must be convolved is to obtain a sufficient number of convolved traces for the stacking to be effective. Consequently, this method is computationally intensive.

In many applications, it is sufficient to identify multiple reflections by their kinematics (i.e., traveltimes) alone. Once the identification has been made, appropriate filtering schemes can be used to filter the multiples. Alternatively, an interpreter examining a seismic section having an identified multiple reflection therein would simply ignore the identified multiple reflection for interpretive purposes. For such applications, it is desirable to have a computationally fast method for predicting the kinematics of multiple reflection events. The present invention satisfies this need.

SUMMARY OF THE INVENTION

The present invention is a method for computing the traveltimes of multiply reflected seismic events in a seismic profile or a model provided that traveltimes for the primary events are available. The traveltimes for the primary events may be obtained by ray tracing through a velocity model of the subsurface or by picking traveltimes from primary reflection horizons present in an actual seismic data set. The traveltimes for the primary events define a traveltime table for various combinations of source and receiver locations. The traveltime for a multiple corresponding to specified source and receiver positions is then determined by summing the traveltimes for primary events from the source to an interim point and from the interim point to the receiver: the correct location of the interim point corresponding to an actual multiple reflection raypath from the source to the receiver is the one that, according to Fermat's principle, has the minimum value for the summed traveltime. This method is applicable to all primary events, so that the traveltimes of subsurface multiples as well as of water bottom multiples can be determined.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENTS

Figure 1:
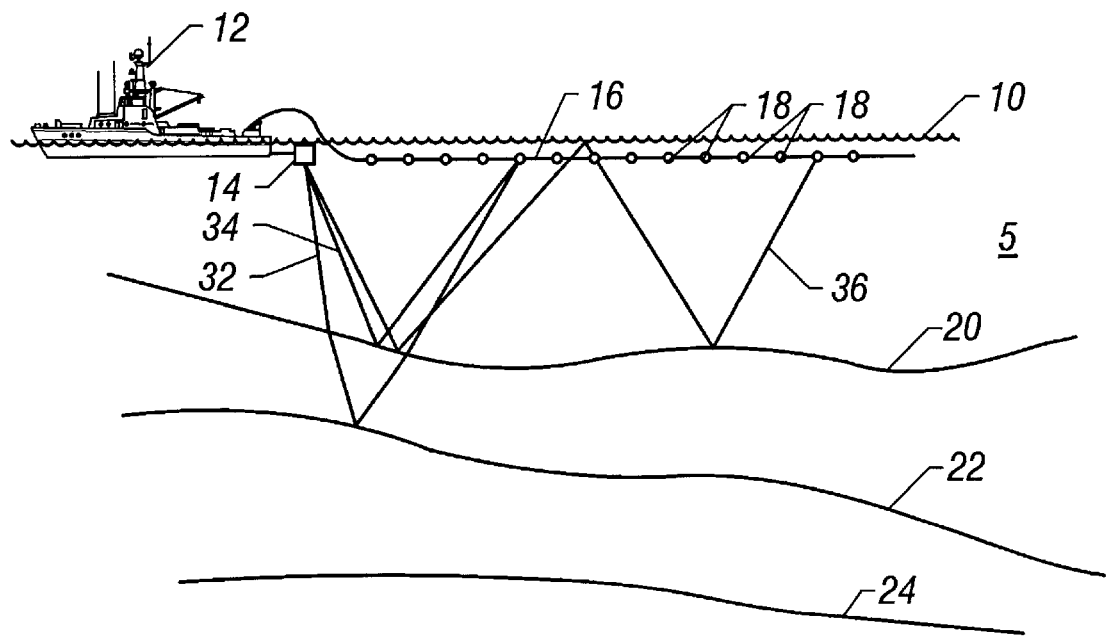
FIG. 1 is a schematic illustration of a marine seismic data acquisition showing examples of reflections from the water bottom and reflecting horizons underneath.

Referring now to FIG. 1, a schematic illustration of marine seismic survey is shown. A body of water 5 having an upper surface 10 and water bottom 20 is shown. A seismic survey ship 12 in the body of water carries a streamer cable 16 that has seismic detectors 18 thereon. For acquisition in a marine environment, the detectors commonly used are hydrophones that are sensitive to pressure pulses in the water.

Deployed from the vessel 12 is a seismic source 14 for emitting an acoustic wave into the water. The source could be a compressed air gun, a marine vibrator or other types of sources known to those versed in the art. Arrays of such sources could also be used. The emitted acoustic wave travels downwardly along a plurality of paths and is reflected from the interfaces between materials of varying acoustic impedance such as the ocean bottom 20, and is reflected back upwardly to be picked up by the detectors 18. The wave also travels into the subsea bed and is reflected at the interface 22. For simplifying the illustration, only one such reflecting interface is shown: in reality, there would be many such reflecting interfaces (reflectors). The wave paths shown at 34 and 32 are referred to as direct or primary waves, since the path includes only one reflection from an interface within the ocean or the sea bed before detection by a detector. A "Multiple" reflection is also shown in FIG. 1 by the raypath 36 that is reflected twice from the bottom of the ocean 20 and once from the ocean surface 10. Other types of multiples also exist wherein the raypaths correspond to reflections from reflectors such as 22 or 24 and also from the water bottom 20, as well as reflections from more than one reflector such as 22 and 24. These are ray paths according to which the wave reaches the surface more than once. As discussed above, such multiples are a source of much aggravation in seismic data processing because they obscure actual seismic primary events which happen to take place at a time comparable to that taken by the multiply-reflected wave to reach the same hydrophone and are a source of spurious data. Accordingly, it is desirable that a method for identification of such multiple seismic events from seismic records be provided.

The discussion above of multiple reflections in a marine seismic survey is intended only to be an example of the occurrence of multiple reflections in a seismic survey. Multiple reflections do occur in land seismic surveys as well and the present invention may be used for determining traveltimes of multiple reflections in land seismic surveys as well.

A 2-D seismic data set in the prestack stage consists of a large number of traces, each of which is characterized by the position of the source that generated an acoustic impulse and the position of the receiver (or detector) that detected and recorded the response of the earth to that impulse. The source and receiver positions along a seismic line are specified in terms of a single coordinate, called the station number. Thus a trace can be specified by an ordered pair of numbers $(S_i, R_j)$, where $S_i$ means that the source corresponding to the trace was located at station number i, and $R_j$ means that the receiver was located at station number. Note that the special case of i=j specifies a so-called zero-offset trace, i.e., the source and receiver are at the same location.

In the present invention, the traces in a seismic data set are analyzed to identify the traveltimes of one or more primary reflection events, such as one corresponding to the raypath 32 discussed above with reference to FIG. 1. The traveltime data for the n-th primary reflection can be represented by a traveltime table $tp_n (S_i, R_j)$ These data are simply traveltimes arranged in a two-dimensional table or array. Each row of the table is associated with a particular source station number and each column with a particular receiver station number. Table I gives an example of such a traveltime table.

TABLE I

| Traveltime table for Primary reflection No. 1. | | | | | | | | |
|---|---|---|---|---|---|---|---|---|
| Rec. → Source↓ | 1 | 2 | 3 | 4 | 5 | 6 | 7 | 8 |
| 1 | 1.5 | 1.503 | 1.513 | 1.530 | 1.552 | 1.581 | 1.616 | 1.655 |
| 2 | 1.503 | 1.5 | 1.503 | 1.513 | 1.530 | 1.552 | 1.581 | 1.616 |
| 3 | 1.513 | 1.503 | 1.5 | 1.503 | 1.513 | 1.530 | 1.552 | 1.581 |
| 4 | 1.530 | 1.513 | 1.503 | 1.5 | 1.503 | 1.513 | 1.530 | 1.552 |
| 5 | 1.552 | 1.530 | 1.513 | 1.503 | 1.5 | 1.503 | 1.513 | 1.530 |
| 6 | 1.581 | 1.552 | 1.530 | 1.513 | 1.503 | 1.5 | 1.503 | 1.513 |
| 7 | 1.616 | 1 581 | 1.552 | 1.530 | 1.513 | 1.503 | 1.5 | 1.503 |
| 8 | 1.655 | 1.616 | 1.581 | 1.552 | 1.530 | 1.513 | 1.503 | 1.5 |

Figure 2:
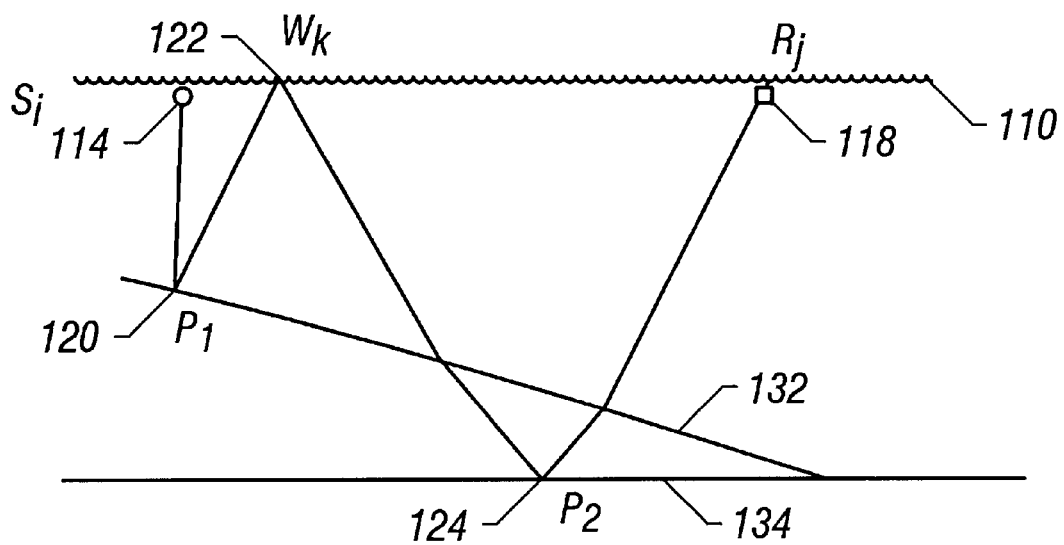
FIG. 2 illustrates the raypaths involved in a multiple reflection.

The invention is best explained by considering a specific example. FIG. 2 shows a generic, first-order, marine surface multiple whose travel path from the source $S_i$ at 114 to the receiver $R_j$ at 118 is $S_i$ $P_1$ $W_k$ $P_2$ $R_j$ where $P_1$ and $P_2$ are upward reflection points from the reflectors 132 and 134, and $W_k$ is the downward reflecting point at the water surface. Without performing ray tracing, the actual locations of the points $P_1$, $W_k$ and $P_2$ are unknown. However, there are two key facts about this multiple event that are known. First, according to Fermat's principle, the actual travel path of the multiple, whatever it may be, is the one travel path out of all travel path possibilities that has the minimum traveltime. Second, it is clear from FIG. 1 that the traveltime of the multiple is the sum of the traveltimes of the two primary reflections that make up the multiple. That is, $tm_1(S_i, R_j) = tp_1(S_1, W_k) + tp_2(W_k, R_j)$ where $tm_1$ refers to the traveltime of the multiple.

Hence, if the location of station number k were known, the traveltime of the multiple could be obtained simply by summing the traveltimes of the two primary events that make up the multiple. The traveltimes for the two primary events are obtained by simply looking them up in the traveltime tables for the two reflecting horizons. The present invention determines the traveltime of the multiple by, first, determining and saving the multiple traveltimes for every possible location of the point $W_k$, and, second, selecting from those determined traveltimes the smallest. According to Fermat's principle, that result must be the actual traveltime of the multiple and the corresponding position of $W_k$ is the actual reflection point from the surface for the multiple. Those versed in the art would recognize that the statement of Fermat's principle made above covers the vast majority of reflection traveltimes, and the situation in which the traveltime is a maximum are usually unimportant.

Figure 3:
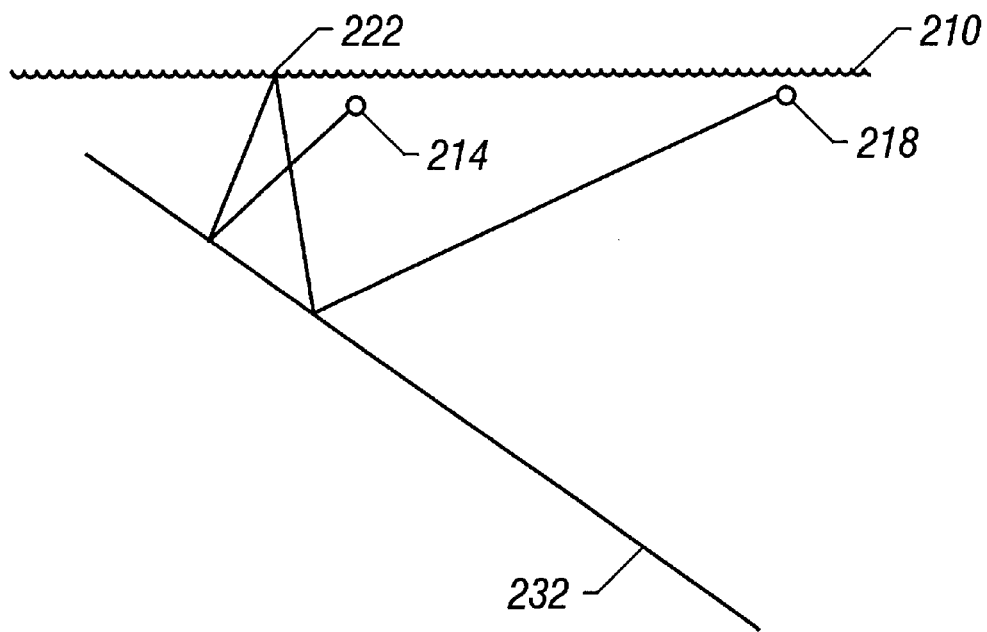
FIG. 3 illustrates the use of the principle of reciprocity to fill in the traveltime tables.

For constructing the traveltime tables, the present invention includes an additional step that may be necessary using the principle of reciprocity. This is best understood by reference to FIG. 3 wherein a multiple reflection from the source 214 to the receiver location 218 that reflects twice from the reflector 232 is shown. The surface reflection point in this case is at location 222 and clearly, in marine seismic acquisition where the source and the receivers are towed behind a ship (as in the direction shown in FIG. 1), there would be no data or primary reflection traveltime corresponding to a source at location 214 and a receiver at location 222. In such a case, the principle of reciprocity states that the reflection traveltime for a source at location 214 and receiver at 222 is the same as for a source at location 222 and a receiver at location 214. As the ship sails from right to left, this data would be recorded subsequent to the data wherein the source is at location 214. In one aspect of the invention, the principle of reciprocity is used to fill in gaps in the traveltime table that are simply a result of the acquisition geometry.

A second aspect of the invention involves the situation wherein for certain combinations of source and receiver locations, no data is available for the primary reflection traveltime. In such a case, the traveltime table is filled in with a large value that is larger than any that are expected to occur. Since multiple traveltimes are always picked by choosing the least of the sum of primary event traveltimes, this ensures that the missing traveltimes will not contribute anything to the final results. Those versed in the art would recognize that a traveltime could be missing because in a complicated geology, some reflecting horizons may not have a raypath connecting every source-receiver position.

Figure 4:
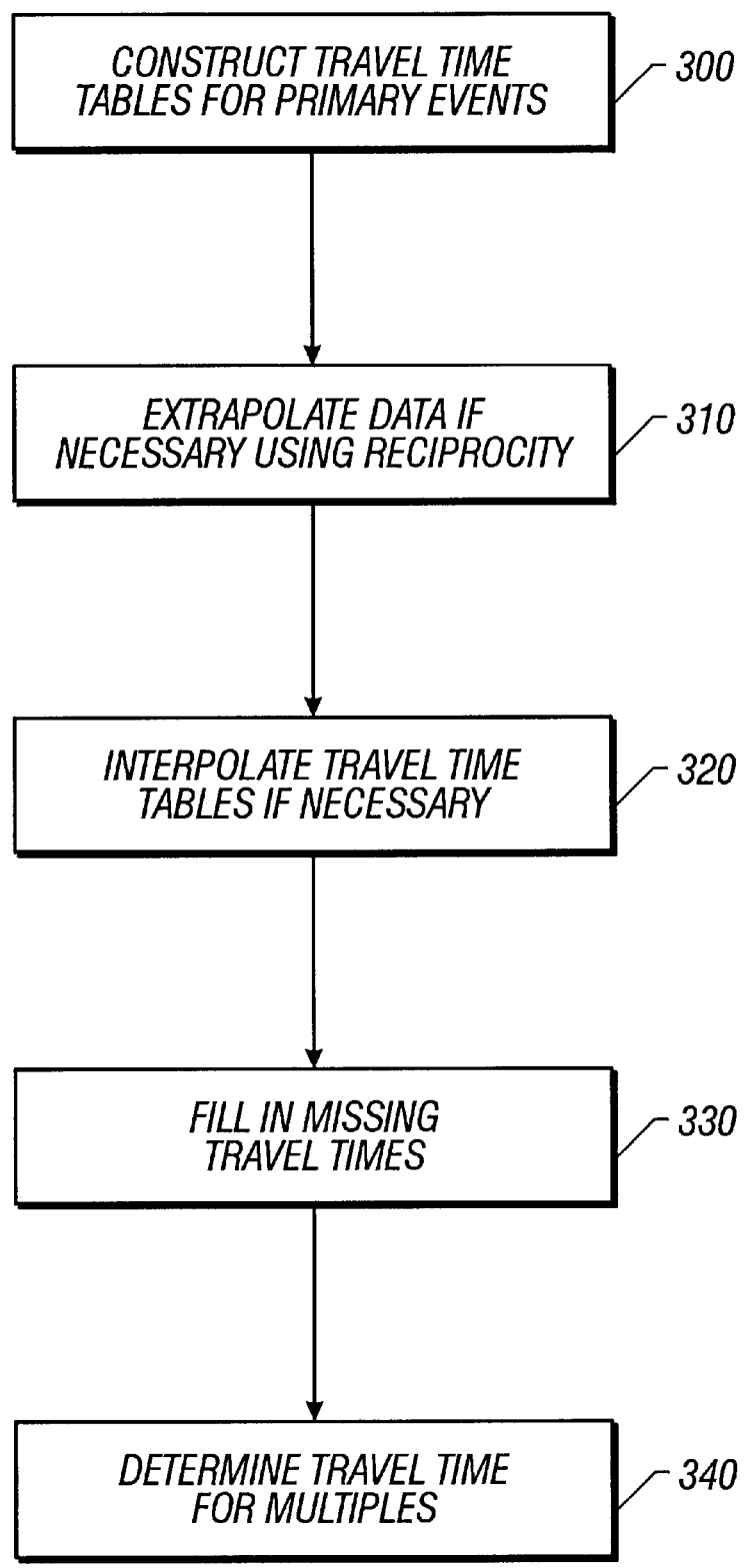
FIG. 4 shows an outline of the major steps of the present invention.

Turning now to FIG. 4, the steps of the present invention are discussed. The objective of the invention, as discussed above, is to determine traveltimes for multiple reflections between a plurality of source and receiver locations when traveltimes for primary reflection events are available. At 300, a traveltime table for primary reflection events is compiled. An example of such a traveltime table was discussed above with reference to Table 1. The traveltimes that go into this table could be obtained from many methods, including making picks on a seismic section or by a process of modeling using a velocity model. Such methods would be known to those versed in the art.

Next, the traveltime table is extrapolated 320 where necessary using the principle of reciprocity. This was discussed above with reference to marine seismic data acquisition where the receiver locations are necessarily on one side of the source, how far the extrapolation is carried out depends upon the subsurface geometry; those versed in the art would recognize that with a sloping water bottom, the reflection point for one of the primary events could be on the opposite side of the source from the receiver location.

On some occasions, the spacing between the source locations in a seismic survey may be different from the spacing between the receiver locations. In order to use the method of the invention, it is desirable that the two spacings (i.e., the source spacing and the receiver spacing) be the same. If the spacings are different, the traveltime table is interpolated 320 so that the two are equal. In the invention, methods of interpolation such as linear interpolation or polynomial interpolation may be used. A special case of a polynomial interpolation that may be used is a cubic spline. Such methods of interpolation would be known to those versed in the art and are not discussed further.

As discussed above, in some cases, missing values of traveltimes may have to be in filled. This is done, if necessary, and a completed traveltime table is constructed 340 for primary events for a selected set of shot locations.

Figure 5:
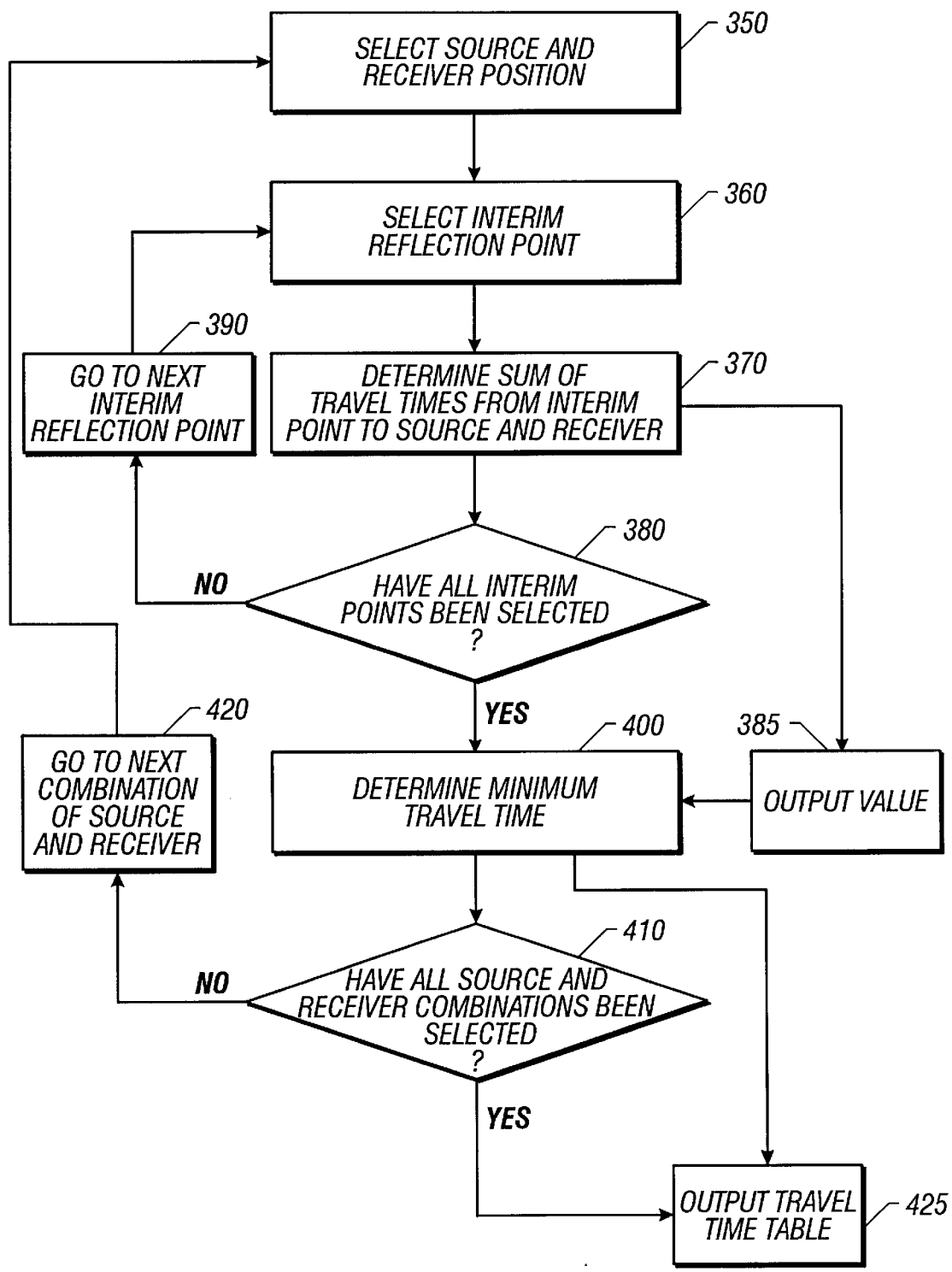
FIG. 5 shows details of the manner of determination of traveltime for multiple reflections.

Turning next to FIG. 5, determination of traveltimes for multiples is discussed. A shot and receiver location are selected 350. For the selected shot and receiver location, an interim reflection point is selected 360 as discussed above with reference to 122 in FIG. 2. For the interim reflection point, the sum of the traveltimes for the primary events from the interim reflection point to the source and to the receiver are determined 370. This step involves using a primary traveltime table, an example of which is given above in Table 1. When the subsurface reflecting interface for the multiple is the same for the two legs of the multiple, then it can be seen that only one table, such as Table 1, would be necessary. If however, the reflecting interfaces are different, e.g., one is a water bottom reflection and the other is a subsurface reflecting interface, data from two tables would be necessary.

The summed traveltimes are output 385, along with position information on the interim reflection point and a check is made to see if all values of the interim reflection point have been evaluated. If not, another interim reflection point is selected 390 and the process goes back to 360 for determination of a summed traveltime. Once all reasonable values of the interim reflection point have been evaluated, the minimum traveltime for the output values 385 is determined and this time is the traveltime for the selected shot and receiver spacing locations. This value is saved in an output traveltime table and a check is made to see if all source-receiver combinations have been processed. If not, a new shot-receiver pair is selected 420 and the process repeated starting at 350. Once all the shot-receiver pairs have been processed, a complete traveltime table is output 425.

The process is repeated for other primary reflections until the multiples for the desired primary reflection events have been evaluated. These multiples are called first order multiples. Those versed in the art would recognize that the entire process described with reference to FIGS. 4 and 5 can be carried out using, instead of only primary traveltime tables, a combination of primary and first-order multiple traveltime tables to give traveltime tables for second-order multiples. This process may be repeated further if desired using the traveltimes for the primary, first and second order multiples in any combination. All such applications are intended to be within the scope of the present application.

Next, an example is given of the manner in which the minimum is determined in FIG. 5. For this purpose, the data of Table 1 are used as one primary traveltime table and the data from Table 2 below are used as a second primary traveltime table.

TABLE 2

Traveltime table for Primary reflection No. 2.

| Rec. →<br>Source↓ | 1 | 2 | 3 | 4 | 5 | 6 | 7 | 8 |
|---|---|---|---|---|---|---|---|---|
| 1 | 2.5 | 2.502 | 2.507 | 2.518 | 2.532 | 2.550 | 2.571 | 2.596 |
| 2 | 2.502 | 2.5 | 2.502 | 2.507 | 2.518 | 2.532 | 2.550 | 2.571 |
| 3 | 2.507 | 2.502 | 2.5 | 2.502 | 2.507 | 2.518 | 2.532 | 2.550 |
| 4 | 2.518 | 2.507 | 2.502 | 2.5 | 2.502 | 2.507 | 2.518 | 2.532 |
| 5 | 2.532 | 2.518 | 2.507 | 2.502 | 2.5 | 2.502 | 2.507 | 2.518 |
| 6 | 2.550 | 2.532 | 2.518 | 2.507 | 2.502 | 2.5 | 2.502 | 2.507 |
| 7 | 2.571 | 2.550 | 2.532 | 2.518 | 2.507 | 2.502 | 2.5 | 2.502 |
| 8 | 2.596 | 2.571 | 2.550 | 2.532 | 2.518 | 2.507 | 2.502 | 2.5 |

Table 3 gives the sum of the primary traveltimes from a source at location 1 to an interim reflection position and from the interim reflection position to a receiver at location 8. This is obtained using the data from Tables 1 and 2.

TABLE 3

Sum of traveltimes from source at location 1 to an interim position and from the interim position to a receiver at location 8:

| Interim position | 1 | 2 | 3 | 4 | 5 | 6 | 7 | 8 |
|---|---|---|---|---|---|---|---|---|
| Time | 4.096 | 4.074 | 4.063 | 4.062 | 4.07 | 4.088 | 4.118 | 4.155 |

In Table 3, the summed traveltimes corresponding to the different interim positions are listed. It is seen that the minimum traveltime is 4.062 and occurs when the interim reflection point is at location 4.

The example shown above is for illustrative purposes only: in the invention itself, many more source receiver positions would be present, and many more interim reflection positions would be evaluated. Furthermore, the calculations could be carried out to a higher degree of accuracy (in Tables 1–3, the data have been rounded off to the nearest millisecond, i.e, 0.001 seconds). Optionally, an interpolation of the determined summed traveltimes may be carried out using known methods to obtain the minimum summed traveltime.

Another aspect of the invention is the use of a limited aperture for search for the interim reflection point. By reducing the number of table lookups required, this reduces the overall computation time for the determination of multiple traveltimes. In a 2-D case, such as that discussed above, the reduction in the overall computation time may not be significant. However, in 3-D seismic data acquisition, this can have a major reduction in the computation time.

Figure 6:
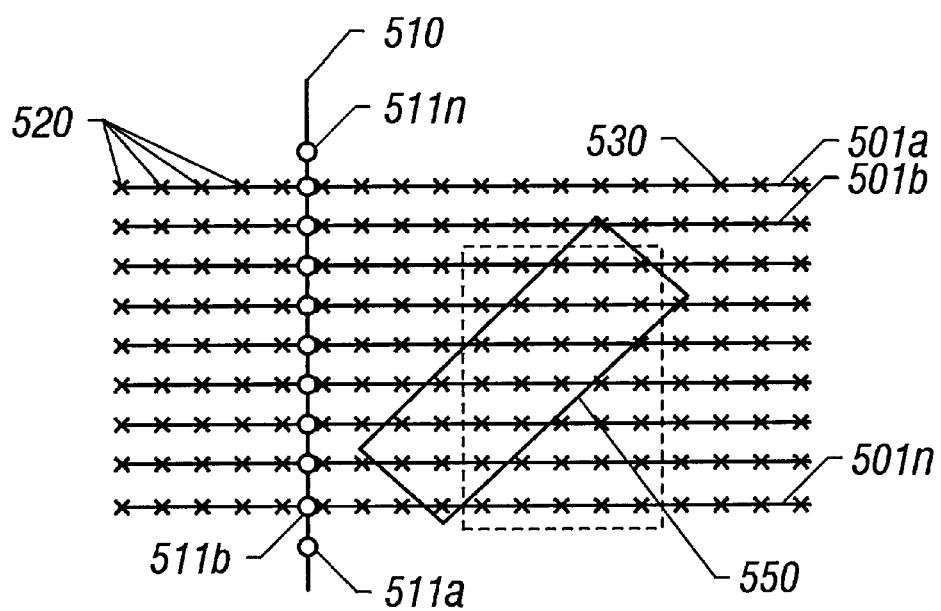
FIG. 6 illustrates the use of a limited aperture of search for the interim reflection point in a 3-D seismic survey.

This is illustrated with reference to FIG. 6 where a plan view of a 3-D seismic survey is shown. A plurality of receiver lines 501a, 501b, ... 501n, each having seismic receivers at locations 520 are shown. An example of a source line 510 is shown, the source line having source locations 511a, 511b, ... 511n. Positioning of the source and receiver locations along straight lines is not intended to be a limitation to the present invention, nor is the orientation of the source lines to the receiver lines. Those versed in the art would recognize that with a large number of source and receiver locations, constructing and accessing the traveltime tables in a table lookup can get time-consuming. In order to limit the computation time, in one embodiment of the present application, only a limited spatial portion of the 2-D array of seismic locations is used. For example, when it is desired to determine a multiple traveltime from a specific source position such as 511a to a specific receiver such as 530, the search for the interim reflection point is limited to a region such as 550. The selection of this region of search, or aperture for the interim reflection point, is based upon knowledge of the orientation of subsurface reflecting interfaces. A precise knowledge of the orientation of the subsurface reflecting interfaces is not required. In FIG. 6 this region of search is shown for illustrative purposes only as a rectangle: other, arbitrary shapes could be used.

Optionally, in a 3-D survey, a two-dimensional interpolation of the summed traveltimes may be carried out to obtain the minimum travel time. The two-dimensional interpolation is, in a preferred embodiment, a bicubic spline. Such an interpolation technique would be known to those versed in the art and is not discussed further.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining at least one multiple traveltime on a seismic survey from a specified source location to a specified receiver location, the seismic survey having a plurality of primary reflections thereon, each of said plurality of primary reflections having a source location, a receiver location, a reflecting interface and a traveltime associated therewith, the method comprising;
    (a) determining a first traveltime for a primary reflection from a source at the specified source location and a receiver at an interim location;
    (b) determining a second traveltime for a primary reflection from a source at the interim location and a receiver at the specified receiver location;
    (c) obtaining a summed traveltime as a sum of the first traveltime and the second traveltime;
    (d) repeating (a)–(c) for a plurality of interim locations to give a plurality of summed traveltimes; and
    (e) determining the traveltime for the multiple reflection as a minimum of the plurality of summed traveltimes.

2. The method of claim 1 wherein the specified source and receiver locations are in a body of water.

3. The method of claim 1 wherein the plurality of primary reflection traveltimes and the associated traveltimes are stored in a traveltime table, and determining the first and second traveltimes further comprises a table lookup.

4. The method of claim 2 wherein at least one of the reflecting interfaces associated with the first or second primary traveltime is a bottom of the body of water.

5. The method of claim 1 further comprising using the principle of reciprocity to obtain the traveltime associated with a source location and a receiver location.

6. The method of claim 1 wherein the seismic survey is a 3-D survey and the interim reflection point is within a limited spatial aperture of the 3-D survey.

7. The method of claim 6 wherein the determining of the minimum of the summed traveltimes further comprises using an interpolation technique selected from (i) a bicubic spline interpolation, and (ii) a polynomial interpolation.

8. The method of claim 1 wherein determining the traveltime associated with a source location and a receiver location further comprises performing an interpolation between available traveltimes proximate to the source and the receiver.

9. The method of claim 8 wherein the interpolation is selected from (i) a linear interpolation, (ii) a polynomial interpolation.

10. The method of claim 1 wherein the determination of the minimum of the plurality of summed traveltimes further comprises using an interpolation technique selected from (i) a spline interpolation, and (ii) a polynomial interpolation.

11. The method of claim 1 wherein the at least one multiple traveltime further comprises a plurality of multiple traveltimes, the method further comprising repeating (a)–(e) to give a plurality of determined first-order multiple traveltimes.

12. The method of claim 11 further comprising using the plurality of determined first order multiple traveltimes to determine a plurality of second-order multiple traveltimes.

* * * * *